Nov. 12, 1968   A. J. GEISENHAVER   3,410,478
LUBRICATING DEVICE FOR A MOTOR COMPRESSOR
Filed May 5, 1967

INVENTOR
ARTHUR J. GEISENHAVER
BY
Barnes, Kisselle, Raisch & Choate
ATTORNEYS

United States Patent Office 3,410,478
Patented Nov. 12, 1968

3,410,478
LUBRICATING DEVICE FOR A MOTOR
COMPRESSOR
Arthur J. Geisenhaver, Tecumseh, Mich., assignor to
Tecumseh Products Company, Tecumseh, Mich.,
a corporation of Michigan
Filed May 5, 1967, Ser. No. 636,476
7 Claims. (Cl. 230—206)

ABSTRACT OF THE DISCLOSURE

A hermetic type motor compressor unit in which oil is centrifugally pumped from the oil-refrigerant sump of the compressor casing up into the oil passageway of a vertically oriented crankshaft by a vertically oriented oil pick-up tube secured to the lower end of the crankshaft. Due to its smaller diameter, the lower extremity of the oil pick-up tube has a surface velocity when rotated at crankshaft operational speed which is slow enough to prevent cavitation of the liquid oil and refrigerant in the vicinity of the inlet aperture of the pick-up tubes. If any cavitation does occur, it will occur farther up the tube where it is sufficiently remote from the inlet to prevent interruption of oil feed through the inlet.

---

In certain small horsepower hermetic motor compressor units the centrifugal oil pump employed to feed oil from the sump up into the vertically oriented crankshaft is in the form of a pick-up tube in which the impeller action is obtained solely or primarily by the "skin friction" of the inner wall of the tube, the pumping arm being equivalent to the progression in inside diameter from that at the inlet aperture at the lower end of the tube to that at the larger outlet aperture at the upper end of the tube. Examples of such prior art pick-up tubes having a conical wall configuration are to be found in United States Patents Nos. 2,287,203; 3,125,184; 3,187,994 and 3,194,490. However, such conical tubes have not found commercial favor due, inter alia, to the difficulty of deep drawing a conical shape and the attendant higher cost of producing this configuration.

In the commercial prior art an oil pick-up tube has been used which is cylindrical in configuration and of constant diameter from its upper end down close to its lower end, the entire diametrical transition from the cylindrical portion to the smaller inlet aperture being provided in a rather blunt shaped bullet-like nose at the lower end of the tube. Although this configuration is less costly to manufacture than a conical tube it has been found that due to the large diameter of the shank of the tube adjacent its inlet the oil surrounding the exterior of the tube in the vicinity of the tube inlet may be spun with sufficient force to cause cavitation and thereby create a gas pocket at the inlet which prevents flow of oil into the inlet of the tube, thereby cutting off the supply of lubricant to the bearings of the crankshaft and connecting rod. In a very short time this can ruin the compressor.

It is an object of the present invention to provide an oil pick-up tube for a hermetic motor compressor unit of the vertical shaft type which overcomes the aforementioned cavitation problem without significantly increasing the manufacturing cost of the tube.

Other objects as well as the features and advantages of the present invention will become apparent from the following detailed description taken in conjunction with the accompanying drawing wherein.

Figure 1:
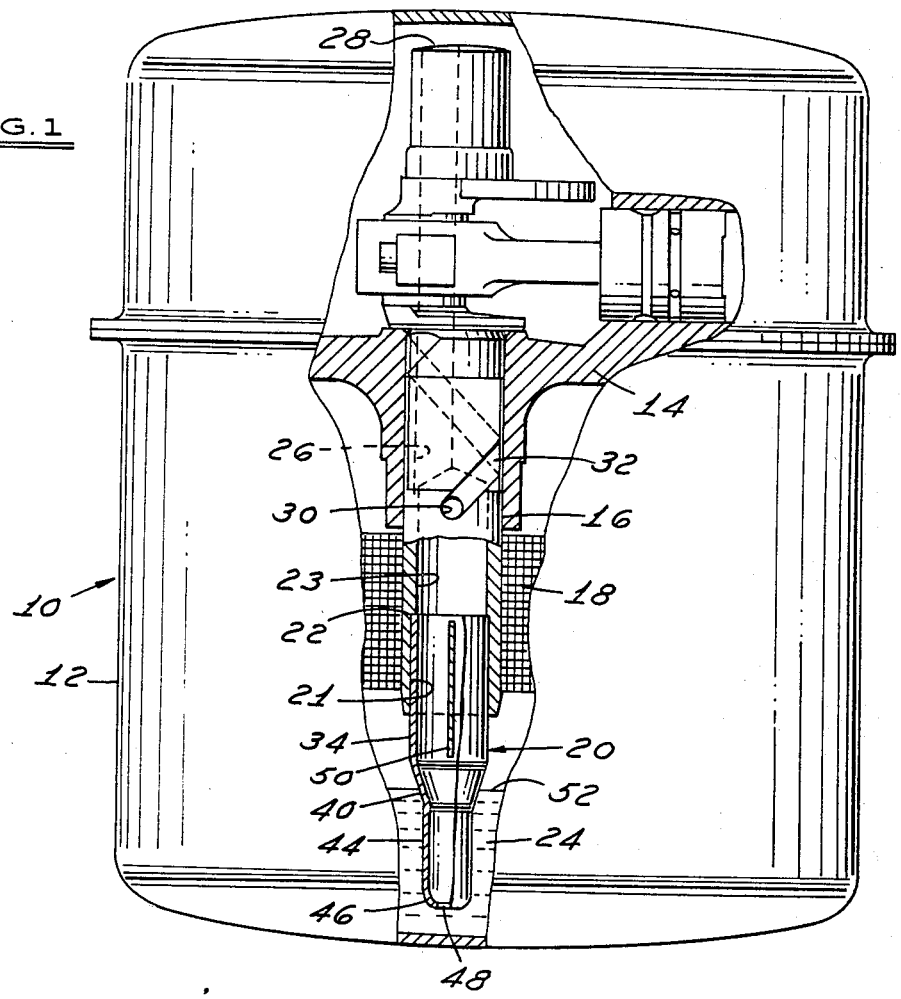
FIG. 1 is a side elevational view of a hermetically sealed motor compressor unit with a portion of the casing, motor, crankshaft and pick-up tube of the present invention broken away and shown in vertical center section.

Referring to the drawing, FIG. 1 shows a motor compressor 10 for small refrigerating machines of conventional construction. The unit is enclosed in a sealed, two-part casing 12 and contains a cast frame and block 14 suitably suspended from the casing. The compressor shown is of the piston type with the compressor mounted above the electric driving motor and having a common drive shaft-crankshaft 16 journaled in the frame and supporting the motor rotor 18. Shaft 16 is thus disposed for rotation about a vertical axis and is provided at its lowermost end with a hollow, stepped oil pick-up tube 20 provided in accordance with the present invention. Tube 20 is inserted in a counterbore 21 in shaft 16 until its open upper end abuts a shoulder 22 at the junction of counterbore 21 with the main axial bore 23 of shaft 16. Tube 20 may be suitably secured as by a press fit, either removably or permanently, in shaft 16 so as to rotate therewith and protrudes downwardly into the pool of liquid oil and refrigerant 24 in the sump of casing 12. Bore 23 is concentric with the axis of shaft 16 and communicates at its upper end with an axially extending feed passage 26 which is offset laterally from the rotational axis of shaft 16. Passage 26 extends upwardly through the throw of the crankshaft and terminates at an opening 28 in the upper end of shaft 16. Shaft 16 may also have a radial port 30 connecting the upper end of bore 23 with an external helical oiling groove 32 to feed the lubricant to the main bearing of the shaft.

Figure 2:
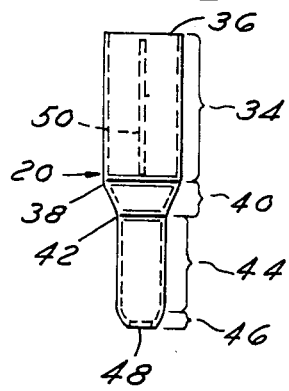
FIG. 2 is a side elevational view of the pick-up tube shown by itself.
Figure 3:
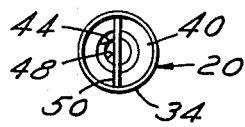
FIG. 3 is a top plan view of the pick-up tube shown is FIG. 2.

Referring to FIGS. 2 and 3 as well as FIG. 1, the oil pick-up tube 20 of the present invention comprises a tubular member which, as best seen in FIG. 2, has an upper portion 34 which extends axially downwardly from the upper end 36 of the tube to a shoulder 38 at the junction of portion 34 with an intermediate stepped down portion 40 of the tube. Portion 34 is cylindrical, both internally and externally, and has an outside diameter adapted to form the desired fit with the inside diameter of counterbore 21. Portion 40 of tube 20 is generally frusto-conical in configuration and extends axially from shoulder 38 to a junction 42 with the upper end of a lower portion 44 of tube 20. Portion 44 is also cylindrical both internally and externally and like portion 34 is concentric with the rotational axis of tube 20. Portion 44 merges at its lower end with a bullet-shaped nose portion 46 of tube 20 which has an inlet aperture 48 at its lowermost extremity which also is concentric with the rotational axis of tube 23. The interior configuration of tube 20 is preferably complemental to the exterior configuration, the radial wall thickness of tube 20 being substantially constant throughout the length thereof.

By way of example and not by way of limitation, a stepped oil pick-up tube 20 constructed as described above in accordance with the following nominal dimensions has provided successful results:

| | Inches |
|---|---|
| Overall length of tube 20 | 2.160 |
| Axial length of portion 34 | 1.03125 |
| Outside diameter of portion 34 | .560 |
| Inside diameter of portion 34 | .498 |
| Combine daxial lentgh of portions 44 and 46 | .750 |
| Outside diameter of portion 44 | .375 |
| Diameter of inlet aperture 48 | .171875 |
| Outside radius of nose portion 46 | .171875 |

An oil pick-up tube 20 dimensioned as set forth above has provided successful results in model AE compressors manufactured by Tecumseh Products Company of Tecumseh, Mich., assignee of applicant herein, ranging in horsepower from 1/20 horsepower up to 1/4 horsepower, containing an oil charge ranging from thirteen ounces to twenty-three ounces and operating at a normal shaft speed of 3,600 r.p.m. In addition, tube 20 when dimensioned as set forth above has been found to avoid cavitation effects even at speeds up to 7,000 r.p.m. and in type 3G oil with a viscosity of 150 at temperatures up to 250 degrees F. Generally speaking, the axial length of portion 34 will depend upon the distance between the lower end of the crankshaft 16 and the normal upper and lower limits of the oil level in the sump of the compressor and can be varied over a considerable range to accommodate such oil level variations. However, the combined axial length of portions 44 and 46 should not be reduced much below three quarters of an inch. The outside diameter of lower portion 44 should not exceed about three-eighths of an inch in the aforementioned model AE compressors or equivalent but for other applications this dimension can be varied within limits determined by the diameter of the inlet orifice 48, the angular velocity of the crankshaft, the type of liquid in which the tube is submerged and spins, and the temperature and viscosity of the liquid as will be apparent to one skilled in the art from the disclosure herein.

Oil pick-up tube 20 may be economically mass produced in a progressive draw stamping operation from aluminum killed deep draw quality cold rolled steel. For example, to make a pick-up tube dimensioned as set forth above, sheet steel of .052 inch thickness is die blanked into a circular disc of 1.625 inches diameter. The flat disc is then progressively drawn first into a cup shape and then in three more draws into an elongated cylindrical tube of uniform diameter having a length of 1.75 inches (plus about a one-quarter inch holding margin at the open end) and an outside diameter of .560 inch.

In two more draws portions 40 and 44 are formed, during which draws the overall length of the drawn portion of the tube is increased to final dimension. Then the excess holding material is trimmed off the upper end of the tube, aperture 48 is pierced in the lower end of the tube, and then a final swaging operation is performed which brings the tube to an accurate finished size. Due to the cylindrical configuration of upper and lower portions 34 and 44 of the tube 20, the same is relatively economical to produce in a draw process as compared to a conical tube having the same overall length and the same inlet and outlet orifice diameters.

If desired, tube 20 may be provided with a divider 50 in the form of a flat rectangular sheet metal partition having a wides slightly larger than the inside diameter of portion 34 and a length slightly less than the axial length of portion 34 so that divider 50 is adapted to be inserted endwise with a press fit into the position shown in FIGS. 1, 2 and 3 where it extends diametrically across the bore of portion 34. Divider 50 will increase the output of the pump by reducing the slippage between the oil film and the inner surface of the tube 20, i.e., by acting as an impeller vane in the tube. Divider 50 also tends to break up Freon bubbles in a heavily laden Freon-oil mixture, thereby assisting the gas-liquid separating action which occurs within shaft 16 above tube 20.

Tube 20 is suspended from shaft 16 such that its lower extremity is normally submerged in the pool of oil and refrigerant liquid 24 in the casing sump, preferably with the surface 52 of the liquid normally above junction 42 as shown in FIG. 1. Under these conditions, gravity will tend to force the liquid from sump 24 into tube 20 via inlet aperture 48 up to the sump surface level 52. When the compressor unit 10 is operating, tube 20 is spun at shaft r.p.m. and hence immediately upon the liquid entering aperture 48 rotational motion will be imparted to the liquid by the frictional drag exerted on the liquid by the inner wall of portions 46 and 44. The centrifugal force thus developed on the liquid produces, when the liquid is acting against the interior wall surfaces of the tube, an upwardly directed pressure on the oil in two stages, the first being in the immediate vicinity of aperture 48 due to the outward and upward inclination of the inner wall of nose portion 46, and the second being where the diameter of the tube again increases at the conical portion 40. The centrifugal force acting on the whirling oil is thus sufficient to pump a film of oil up the wall of tube 20 and bore 23 to the aforementioned oil feeding passages 26 and 32 for the distribution to the points of lubrication.

The body of oil 24 surrounding the exterior surface of the submerged portions of tube 20 is also whirled by the skin friction of this surface on the adjacent oil. However due to the predetermined small diameter of portion 44 relative to portion 34, the surface speed of the external surface of portion 44 in the vicinity of inlet 48 is slow enough to prevent cavitation of the liquid oil and refrigerant mixture in the vicinity of aperture 48. If any cavitation does occur, it will occur farther up tube 20, i.e., adjacent portion 40 or 34, where it is sufficiently remote from inlet 48 to prevent interruption of oil feed through inlet 48.

From the foregoing description, it will now be apparent that the oil pick-up tube of the present invention provides an economical solution to the problem of oil flow blockage by cavitation at the inlet of the tube. In addition, due to the lower extremity 44–46 of tube 20 having a cylindriual configuration for at least a major portion of its axial length, the first stage centrifugal pumping action is disposed closely adjacent inlet 48 and hence pump output will remain sufficient to meet minimum lubrication requirements even when the liquid level 52 drops almost to the level of inlet 48.

What is claimed is:

1. A centrifugal liquid pumping device comprising a hollow tube adapted to be rotated about its longitudinal axis with at least one end thereof submerged in a source of the liquid to be pumped, said tube having an inlet at said one end of said tube and an outlet at the other end of said tube with at least a portion of the area of said outlet being disposed radially outwardly from said axis a distance greater than that of the periphery of said inlet from said axis, said tube having a substantially cylindrical first portion of a predetermined outside diameter concentric with said axis and extending from adjacent said inlet axially of said tube for a predetermined distance, said tube having a second portion of larger outside diameter than said first portion extending between said first portion and said outlet, said predetermined diameter of said first portion being correlated with the rotational speed of said tube and the characteristics of the liquid being pumped to prevent cavitation of liquid disposed in contact with the external surface of said first portion and said predetermined axial distance of said first portion being sufficiently large to isolate the liquid whirling effect of said second portion from said inlet whereby flow of liquid into the inlet of said tube is unimpeded by the whirling motion imparted by said tube to the liquid surrounding the exterior of said tube.

2. In a hermetic motor compressor unit having a casing with a sump containing a liquid oil-refrigerant mixture, an electric motor and a refrigerant compressor mounted in said casing and having a vertically oriented shaft connecting said motor in driving relation with said compressor and disposed with its rotational axis intersecting said sump, the combination therewith of an oil pumping system including an oil flow passage in said shaft open at one end thereof adjacent said sump and an oil pick-up tube connected to said end of said shaft for rotation therewith and having an upper end with an outlet communicating with said shaft passage, said oil pick-up tube being operable as a centrifugal liquid pumping device and comprising a hollow tube oriented with its longitudinal axis coincident with the axis of said shaft and having a lower end submerged in the sump liquid, said lower end of said tube having an inlet therein, said outlet having at least a portion of its area disposed radially outwardly from the rotational axis of the tube a distance greater than that of said inlet, said tube having a substantially cylindrical first portion concentric with the rotational axis of said tube extending from adjacent said inlet axially of the tube for a predetermined distance, said tube having a second portion of larger diameter than said first portion extending between said first portion and the outlet end of said tube, said predetermined diameter of said first portion being correlated with the rotational speed of said shaft and the liquid oil-refrigerant mixture in the sump to prevent cavitation of liquid disposed in contact with the external surface of said first portion and said predetermined axial distance of said first portion being sufficiently long to isolate the liquid whirling effect of said second portion from said inlet whereby flow of liquid into the inlet of said tube is unimpeded by the whirling motion imparted by said tube to the liquid surrounding the exterior of said tube.

3. The combination as set forth in claim 2 wherein said first portion has a bullet-shaped nose portion defining the extremity of said one end of said tube and said inlet comprises a single circular hole concentric with said axis in said nose portion.

4. The combination as set forth in claim 2 wherein said second portion of said tube comprises a substantially cylindrical portion extending from the outlet end of said tube concentric with the rotational axis thereof and a tapered portion connecting said second portion to said first portion.

5. The combination as set forth in claim 4 wherein said outlet comprises an open end of said second portion having the same diameter as the inside diameter of said second portion.

6. The combination as set forth in claim 4 wherein said second cylindrical portion has a divider partition mounted therein extending diametrically across the interior of said second portion and extending axially thereof substantially coextensively with the axial length of said second cylindrical portion.

7. The combination as set forth in claim 2 wherein the outside diameter of said first portion is in the order of three-eighths of an inch and the axial distance from said inlet to the end of said first portion remote therefrom is on the order of three-quarters of an inch.

References Cited
UNITED STATES PATENTS

| | | | |
|---|---|---|---|
| 2,028,568 | 1/1936 | Sherzer | 103—100 |
| 2,996,240 | 8/1961 | Stocklein et al. | 230—206 |
| 3,317,123 | 5/1967 | Fuhke | 230—207 |

ROBERT M. WALKER, *Primary Examiner.*